United States Patent [19]

Shiga

[11] Patent Number: 5,937,508
[45] Date of Patent: Aug. 17, 1999

[54] METHOD FOR MAKING SQUIRREL-CAGE MOTOR

[75] Inventor: Tsuyoshi Shiga, Nagoya, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/590,908

[22] Filed: Jan. 24, 1996

[30] Foreign Application Priority Data

Jun. 15, 1995 [JP] Japan ................................. 7-148818

[51] Int. Cl.[6] .................................................. H02K 15/02
[52] U.S. Cl. .............................. 29/598; 164/109; 310/211
[58] Field of Search ............................. 29/598; 310/211, 310/212; 164/109

[56] References Cited

U.S. PATENT DOCUMENTS

| | | | |
|---|---|---|---|
| 2,248,167 | 7/1941 | Elsey | 29/598 |
| 3,665,593 | 5/1972 | Savage | 29/598 |
| 3,683,493 | 8/1972 | Begovich | 29/598 |

*Primary Examiner*—Carl E. Hall
*Attorney, Agent, or Firm*—Pillsbury Madison & Sutro LLP

[57] ABSTRACT

A method of making a squirrel-cage rotor employs a forging die assembly including a receiving die receiving one end of a rotor core and having a first annular concavity corresponding to one of two end rings and a pressing die movable relative to the other end of the rotor core to form a second annular concavity corresponding to the other end ring. The one end of the rotor core is set in the receiving die, and a forging material such as aluminum is set at the other end of the rotor core. Subsequently, the pressing die is moved relative to the other end of the rotor core so that the forging material is pressurized to be plastically deformed. The forging material is caused to enter the first concavity through slots of the rotor core. Consequently, the first and second concavities and the slots of the rotor core are filled by the forging material such that a squirrel-cage conductor is formed.

6 Claims, 11 Drawing Sheets

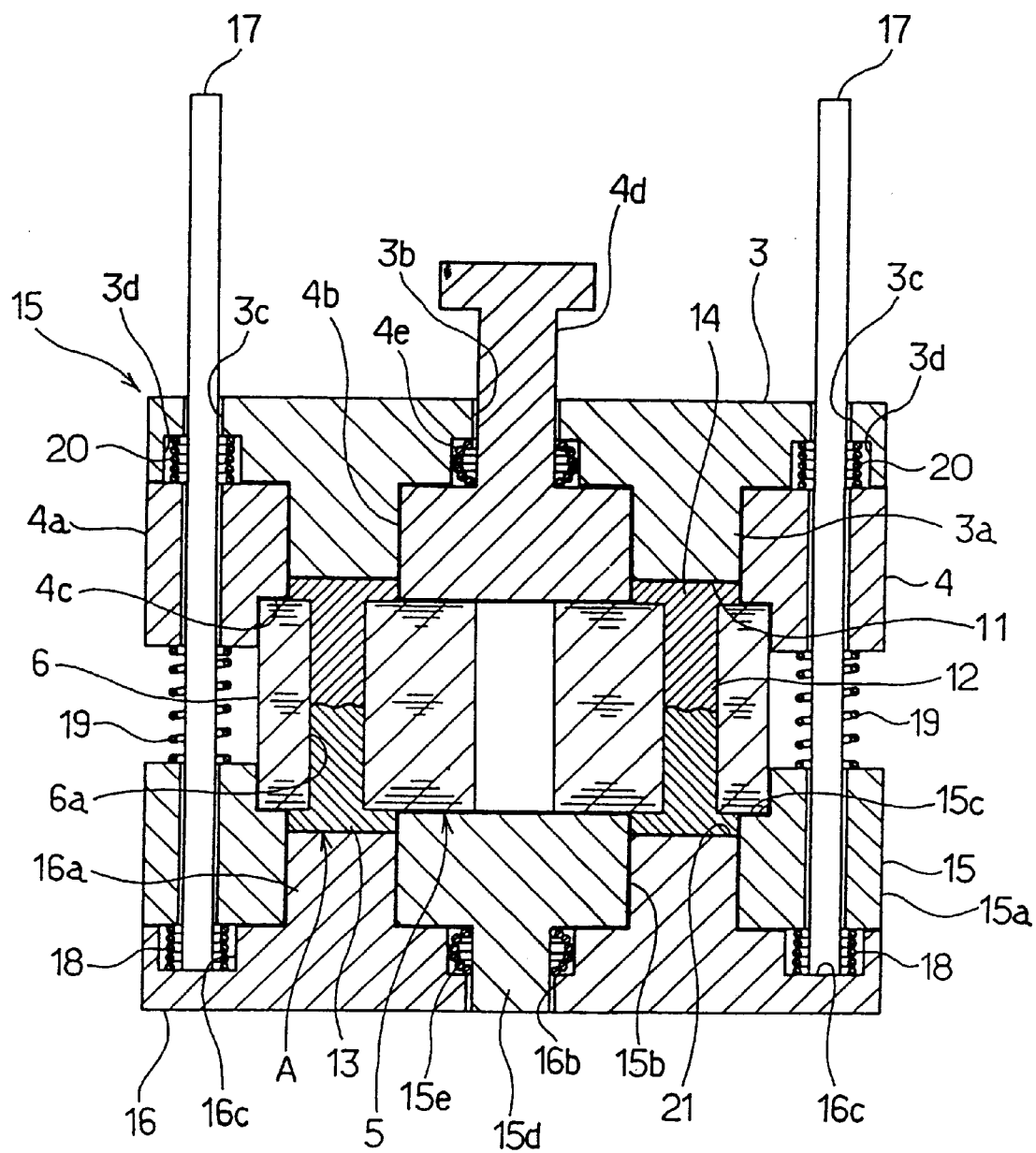
F I G. 6

METHOD FOR MAKING SQUIRREL-CAGE MOTOR

BACKGROUND OF THE INVENTION

1. Field of the invention

This invention relates to a method of making a squirrel-cage rotor for ac motors wherein a squirrel-cage conductor includes bar conductors embedded in slots of a rotor core and two end rings connecting both ends of the slot-embedded conductors respectively.

2. Description of the prior art

In a conventional method of making squirrel-cage rotors for ac motors, silicon steel plates are laminated for composition of a rotor core. The rotor core is then provided with a squirrel-cage conductor by means of die casting with use of molten aluminum. More specifically, the rotor core is accommodated in a metal die. Molten aluminum is poured into the die so that bar conductors embedded in a plurality of slots formed in the outer periphery of the rotor core and two end rings disposed at opposite ends of the rotor core are integrally formed.

In the above-described method, however, the temperatures of a melting furnace for aluminum and the die casting metal die are raised since the squirrel-cage conductor including the bar conductors and the end rings is formed by means of die casting. Consequently, the atmospheric temperature in a work section in a factory or the like is increased. This poses a problem. Furthermore, since working personnel needs to wait for the temperature of the melting furnace to be sufficiently raised up, the working efficiency is lowered. Furthermore, the above-described method requires a step of cutting a pouring gate for the molten aluminum and a step of cooling the rotor core. Thus, the number of steps is increased in the manufacture of the rotors. Additionally, since it is difficult to stabilize fluidity of the molten aluminum, blowholes or cavities are sometimes produced in the bar conductors and the end rings. Consequently, when the quality of products is lowered, the rotor resistance, balance in rotation and the like are varied in the ac motors, which reduces the characteristics of the motors.

SUMMARY OF THE INVENTION

Therefore, an object of the present invention is provide a squirrel-cage rotor and a method of making the same wherein the working environment and the working efficiency can be improved and the manufacturing steps can be simplified in the manufacture of the squirrel-cage rotors and wherein the motor characteristics such as the rotor resistance or the balance in rotation can be prevented from being lowered.

The present invention provides a method of making a squirrel-cage rotor comprising a rotor core having a plurality of slots therein and a squirrel-cage conductor including a plurality of bar conductors embedded in the slots and two end rings interconnecting both ends of the bar conductors in the form of a ring at both ends of the rotor core respectively, the method comprising the steps of pressurizing a forging material disposed at both ends of the rotor core by use of a forging die assembly to plastically deform the forging material, thereby forming the squirrel-cage conductor connecting an electric power supply to the end rings of the squirrel-cage rotor so that junctions of the forging material of the squirrel-cage conductor heat up to be welded.

According to the above-described method, the squirrel-cage conductor including the bar conductors and the end rings can be integrally formed by pressurizing the forging material. Consequently, since the above-described method eliminates die casting by use of molten aluminum, the problems resulting from use of the die casting can be solved.

The forging die assembly preferably includes a receiving die having a first annular concavity for receiving therein one of the ends of the rotor core and corresponding to one of the end rings and a pressing die for forming a second annular concavity corresponding to the other end ring with movement relative to the other end of the rotor core. In the use of the above-described forging die assembly, the method further comprises the steps of setting said one of the ends of the rotor core in the receiving die, setting the forging material in said other end of the rotor core, and moving the pressing die relative to said other end of the rotor core to pressurize the forging material into plastic deformation thereof so that the forging material is caused to enter the first annular concavity through the slots so as to fill the first and second annular concavities and the slots, whereby the squirrel-cage conductor is formed. The squirrel-cage conductor including a plurality of bar conductors and two end rings integrally formed is provided. The die casting can also be eliminated in the above-described method.

In another preferable embodiment, the forging die assembly includes a first pressing die for forming a first annular concavity corresponding to one of the end rings with movement thereof relative to one end of the rotor core and a second pressing die for forming a second annular concavity corresponding to the other end ring with movement thereof relative to the other end of the rotor core. In use of the above-described forging die assembly, the method further comprises the steps of setting the forging material in each of both ends of the rotor core and moving the first and second pressing dies relative to said one and said other ends of the rotor core respectively to pressurize the forging material into plastic deformation thereof so that the forging material is caused to enter the slots such that the forging material from said one end of the rotor core fills the first annular concavity and one part of interior of each slot and such that the forging material from said other end of the rotor core fills the second annular concavity and the other part of interior of each slot, whereby the squirrel-cage conductor is formed. In this case, too, the squirrel-cage conductor including the integrally formed bar conductors and end rings can be formed without the die casting by use of molten aluminum.

The squirrel-cage conductor may be, after being formed, electrically energized so that junctions of the forging material in one of the end rings are caused to generate heat to be thereby welded. Since the variations in the resistance of the bar conductors are reduced, the characteristics of the rotor can be improved. Furthermore, the forging material may be formed in advance of execution of the step of plastically deforming the forging material with fitted convex portions adapted to be fitted into the respective slots of the rotor core. The forging material can be positioned relative to the rotor core when the fitted convex portions are fitted into the respective slots of the rotor core. Consequently, the forging material can be prevented from being displaced when pressed, and the forging stroke can be shortened. Furthermore, the forging material may be formed in advance of execution of the step of plastically deforming the forging material with pressed convex portions adapted to be pressed by the pressing die and corresponding to the slots respectively. Since a pressing force concentrically acts on the pressed convex portions, the forging can be carried out with a relatively small pressing force.

A new supply of forging material is preferably pressed to be caused to enter the slots at least one time after the previous forging material has been caused by the pressing die to enter the slots, whereby the slots are filled by the forging material. Consequently, each slot can be reliably filled by the forging material with a small pressing force eve when each slot has a large axial dimension. Furthermore, the forging material may be initially pressed by a pressing die with a projection so that a depression is formed thereon and wherein the depression is filled by the new supply of forging material. Consequently, the new forging material can be easily adapted to the initially pressed forging material.

In further another preferred embodiment, the forging die assembly includes a receiving die having a first annular concavity for receiving therein one of the ends of the rotor core and corresponding to one of the end rings and a pressing die for forming a second annular concavity corresponding to the other end ring with movement relative to the other end of the rotor core. In use of the above-described forging die assembly, the method further comprises the steps of inserting an elongated bar-shaped forging material through each slot, the bar-shaped forging material having a length larger than each slot, setting said one of the ends of the rotor core in the receiving die under the condition that the bar-shaped forging material has been inserted through each slot, and moving the pressing die relative to said other end of the rotor core to pressurize the bar-shaped forging material into plastic deformation thereof so that the forging material fills both annular concavities and the slots, whereby the squirrel-cage conductor is formed. In the above-described construction of the forging die assembly, the annular concavity of the receiving die, each slot of the rotor core, and the annular concavity of the pressing die are rendered contiguous to one another into a cavity. The bar-shaped forging material, when pressurized by the pressing die, is plastically deformed in the cavity, whereupon the cavity is filled by a metal material. Consequently, the squirrel-cage conductor having a plurality of bar conductors and two end rings both of which are integrally formed is provided. Since the bar-shaped forging material is previously accommodated in each slot, the portion of the bar-shaped forging material composing each bar conductor does not necessitate a large amount of deformation. Only both ends of the bar-shaped forging material needs to be plastically deformed. Consequently, the rotor core can be stably manufactured with a relatively small pressing force.

BRIEF DESCRIPTION OF THE DRAWINGS

Other objects, features and advantages of the present invention will become clear upon reviewing the following description of preferred embodiments thereof, made with reference to the accompanying drawings, in which:

FIG. 6 is a longitudinal section of the die assembly employed in a third embodiment of the method in accordance with the present invention;

DETAILED DESCRIPTION OF THE PREFERRED EMBODIMENTS

Figure 1:
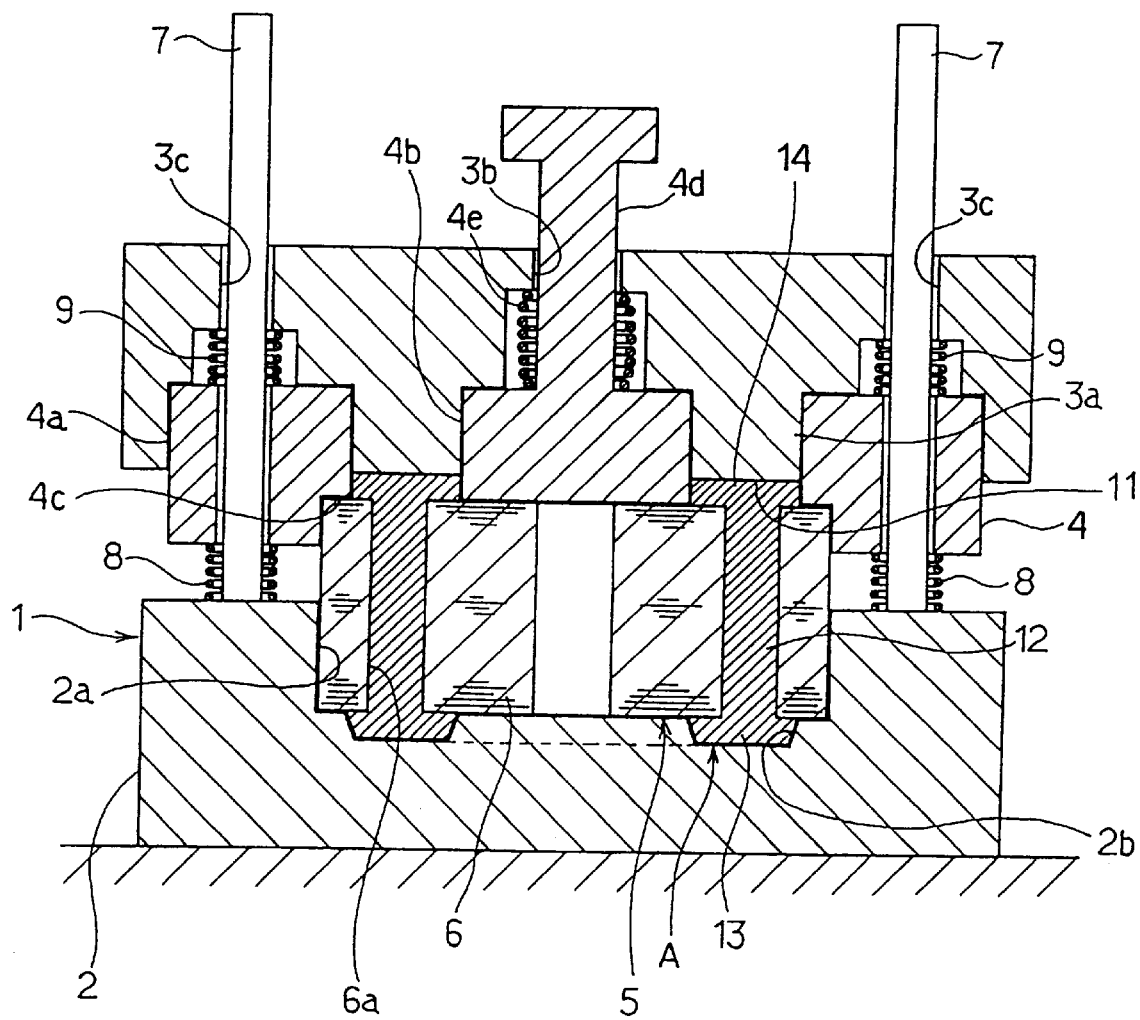
FIG. 1 is a longitudinal section of a die assembly employed in a first embodiment of the method in accordance with the present invention.
Figure 2:
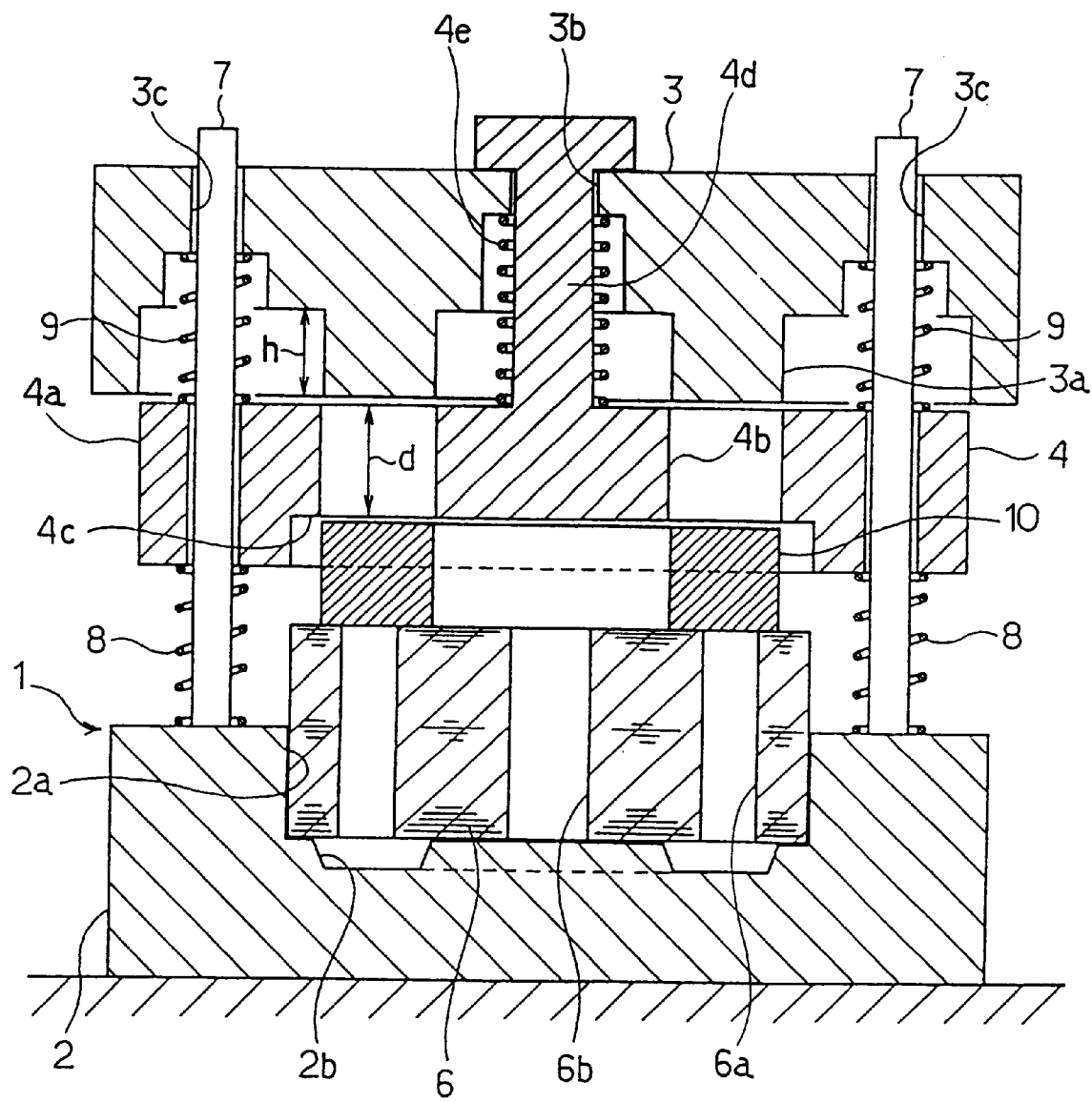
FIG. 2 is a longitudinal section of the die assembly with a rotor core being set on a receiving die.
Figure 3A:
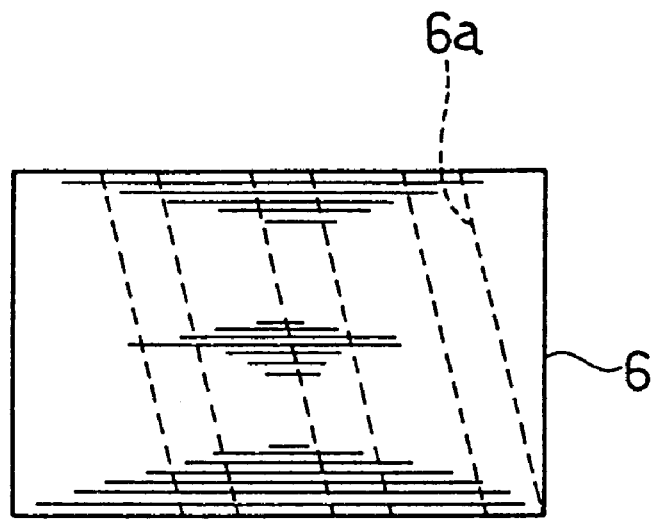
FIGS. 3A and 3B are schematic views of the rotor core as viewed from different angles.
Figure 3B:
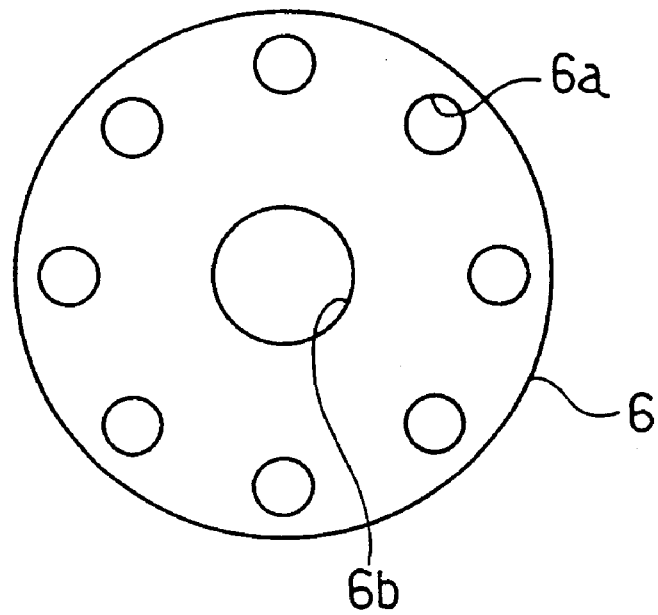

A first embodiment of the present invention will be described with reference to FIGS. 1 to 3. Referring first to FIG. 2, a forging die assembly 1 comprises a lower die 2 serving as a receiving die, an upper die 3 serving as a pressing die, and an intermediate die 4. The lower die 2 has a central rotor core accommodating section 2a formed therein. A rotor core 6 of a squirrel-cage rotor 5 as shown in FIG. 1 is to be accommodated in the section 2a of the lower die 2. The rotor core 6 comprises a plurality of magnetic steel plates such as silicon steel plates axially laminated one upon another as shown in FIG. 3A. The rotor core 6 is formed with a central hole 6b into which a rotational shaft (not shown) is to be inserted, as is shown in FIG. 3B. The rotor core 6 further has a plurality of skewed slots 6a formed at regular intervals in the outer peripheral portion thereof. Eight such slots 6a are formed in the rotor core 6 in the embodiment. The bottom of the accommodating section 2a is provided with a first annular concavity 2b corresponding to a lower end ring 13 of a squirrel-cage conductor A of the squirrel-cage rotor 5. A plurality of guide bars 7 stand on the upper periphery of the lower die 2, extending upwardly.

The upper die 3 is coupled to a cylinder (not shown) so as to be vertically driven. The upper die 3 is provided with an annular convexity or punch 3a formed on the under-surface thereof and corresponding to an upper end ring 14 of the conductor A. The upper die 3 has a central stepped guide hole 3b with a large diameter lower portion. The upper die 3 further has on its undersurface peripheral stepped holes 3c with respective large diameter lower portions. The guide bars 7 are inserted through the holes 3c respectively, whereby the upper die 3 is supported by the guide bars 7 so as to be movable vertically or to and away from the rotor core 6.

The intermediate die 4 comprises an annular outer movable die 4a and a circular block-like inner movable die 4b. The outer movable die 4a has a stepped portion 4c receiving the upper peripheral edge of the rotor core 6. The inner circumferential face of the outer movable die 4a is adapted to be fitted with the outer circumferential face of the punch 3a. The outer movable die 4a has through holes through which the guide bars 7 extend respectively, whereby the die 4a is supported for vertical movement. Each guide bar 7 is provided with a compression coil spring 8 located between the outer movable die 4a and the lower die 2 and a compression coil spring 9 located between the outer movable die 41 and the upper die 3. The inner movable die 4b is adapted to receive the upper face of the rotor core 6. The outer circumferential face of the inner movable die 4b is adapted to be fitted with the inner circumferential face of the punch 3a. A guide shaft 4d formed integrally on the upper face of the inner movable die 4b is inserted through the guide hole 3b of the upper die 3 so that the inner movable die 4b is vertically moved and prevented from falling downwardly. The guide shaft 4d is provided with a compression coil spring 4e located between the inner movable die 4b and the upper die 3 in a large diameter portion of the guide hole 3b.

The upper and intermediate dies 3 and 4 are lowered along the guide bars 7 when the upper die 3 is moved downwardly upon drive of the cylinder. The outer and inner movable dies 4a and 4b of the intermediate die 4 are engaged with the upper portions of the rotor core 6 as shown in FIG. 1, so that the rotor core 6 is held between the outer and inner movable dies 4a and 4b and the lower die 2. Subsequently, the intermediate die 4 is stopped, and the upper die 3 is lowered relative to the intermediate and lower dies 4 and 2. The punch 3a of the upper die 3 is caused to enter a space between the outer and inner movable dies 4a and 4b. A second annular concavity 11 is defined between the undersurface of the punch 3a and the upper surface of the rotor core 6 when the upper die 3 abuts against the intermediate die 4 to be thereby stopped, as is shown in FIG. 1. The second concavity 11 corresponds to the end ring 14 which is to be formed on the upper surface of the rotor core 6. The height h of the punch 3a is set so as to be smaller than the depth d of the space 4a defined between the undersurface of the punch 3a and the upper surface of the rotor core 6, as is shown in FIG. 2.

The making of the squirrel-cage rotor 5 will now be described. The rotor core 6 is accommodated in the section 2a of the lower die 2, and an annular forging material 10 is placed on the upper face of the rotor core 6, as is shown in FIG. 2. The forging material 10 is composed of 99%-, 99.9%- or 100%-aluminum, for example.

The cylinder is then actuated to lower the upper die 3. The compression coil springs 8 are contracted, whereby the upper and intermediate dies 3 and 4 are lowered relative to the lower die 2. Upon descent of the dies 3 and 4, the forging material 10 is fitted into the space defined between the outer and inner movable dies 4a and 4b of the intermediate die 4. Consequently, the forging material 10 is positioned by the intermediate die 4 to be held in position. Successively, the upper peripheral edge of the rotor core 6 is caused to fit with the stepped portion 4c of the outer movable die 4a, whereupon the outer movable die 4a is stopped, and the rotor core 6 is held between the intermediate and lower dies 4 and 2.

The compression coil springs 9 are contracted upon stop of the intermediate die 4 so that the upper die 3 is lowered relative to the intermediate die 4. The punch 3a of the upper die 3 is then caused to enter the space between the outer and inner movable dies 4a and 4b of the intermediate die 4, thereby pressurizing the forging material 10, as is shown in FIG. 1. Consequently, the forging material 10 in the second concavity 11 is plastically deformed to be caused to enter the first concavity 2a through the slots 6a of the rotor core 6. Subsequently, the upper die 3 is caused to abut against the intermediate die 4 to be thereby stopped. Thus, the forging material 10 fills the first and second annular concavities 2b and 11 and the slots 6a of the rotor core 6. The forging material 10 filling the slots 6a is formed into bar conductors 12 of the squirrel-cage conductor A. The forging material 10 filling the first concavity 2b is formed into the first end ring 13 interconnecting the lower ends of the bar conductors 12. The forging material 10 filling the second concavity 11 is formed into the second end ring 14 interconnecting the upper ends of the bar conductors 12. Thus, the squirrel-cage conductor A including the bar conductors 12 and the two end rings 13 and 14 is formed by means of the cold forging and integrally set on the rotor core 6. Upon completion of the forming of the squirrel-cage conductor A, the cylinder is stopped. The expanding force of the compression coil springs 8 and 9 raises the intermediate and upper dies 4 and 3 to the respective former positions thereof. Thereafter, the squirrel-cage rotor 5 including the rotor core 6 and the conductor A integrally set thereon is taken out of the forging die assembly 1.

According to the above-described embodiment, the forging material 10 is pressed by the upper die 3 to be caused to enter the first concavity 2b through the slots 6a in the forming of the squirrel-cage conductor A including the bar conductors 12 and the end rings 13 and 14, whereupon the first and second concavities 2b and 11 and the slots 6a are filled by the forging material 10. Accordingly, since the above-described method eliminates die casting by use of molten aluminum, no melting furnace for molten aluminum nor no metal dies for die casting are necessitated. Consequently, the work section or the like is maintained at a desired temperature for the working. Thus, the working environment can be improved. Furthermore, since the working personnel does not need to wait for the temperature of the melting furnace to be sufficiently raised up, the working efficiency can be improved. Furthermore, the above-described method eliminates the step of cutting the pouring gate for the molten aluminum and the step of cooling the rotor core. Consequently, the number of manufacturing steps can be reduced, which can simplify the manufacturing steps. Additionally, since the fluidity of molten aluminum need not be controlled in the above-described method, occurrence of blowholes or cavities can be prevented in the bar conductors 12 or the end rings 13 and 14. Consequently, the quality of the squirrel-cage conductor A can be improved and stabilized. Thus, the characteristics of the rotor core including the rotor resistance and balance in rotation can be reliably prevented from being deteriorated.

Figure 4:
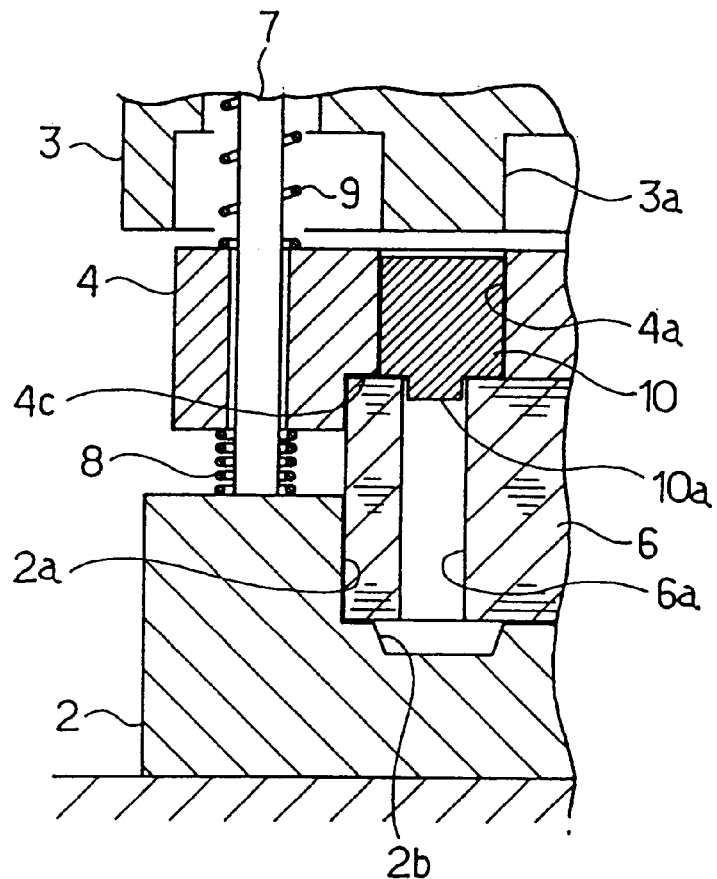
FIG. 4 is a partially enlarged longitudinal section of a die assembly employed in a second embodiment of the method in accordance with the present invention.
Figure 5:
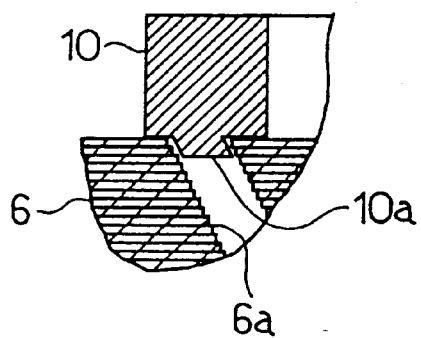
FIG. 5 is a partial view of the rotor core with a convexity being fitted in a slot of the core.

FIGS. 4 and 5 illustrate a second embodiment of the present invention. Identical parts are labeled by the same reference numerals as in the foregoing embodiment. The differences between the first and second embodiments will be described. The forging material 10 has a plurality of fitted convexities 10a formed on the undersurface thereof so as to project toward the rotor core 6. One of the convexities 10a is shown in FIG. 4. The convexities 10a are so formed as to correspond to the slots 6a of the rotor core 6 respectively. The convexities 10a are inclined in accordance with a skew angle of the slots 6a as shown in FIG. 5. The length of each convexity 10a is set so that each convexity can be inserted into the slot 6a.

In the making of the squirrel-cage rotor 5, the fitted convexities 10a of the forging material 10 are fitted into the slots 6a respectively so that the forging material 10 is positioned relative to the rotor core 6, as is shown in FIG. 4. Since the forging material 10 positioned as described above is pressurized by the punch 3a of the upper die 3, the forging material 10 can be prevented from being displaced. Furthermore, since the forging stroke for the forging material 10 is reduced, the bar conductors 12 and the end rings 13 and 14 of the squirrel-cage conductor A can be easily formed by means of forging.

Although the forging material 10 is composed of aluminum in the foregoing embodiments, a relatively soft, electrically well conductive metal such as copper may be employed as the forging material, instead. Furthermore, the forging material 10 is pressurized to be plastically deformed by the punch 3a with descent of the upper die 3 in the foregoing embodiments. The forging material 10 may be pressurized by the punch 3a of the upper die 3 with ascent of the lower die 2, instead, so that the upper die 3 is moved relative to the upper surface of the rotor core 6.

Figure 7:
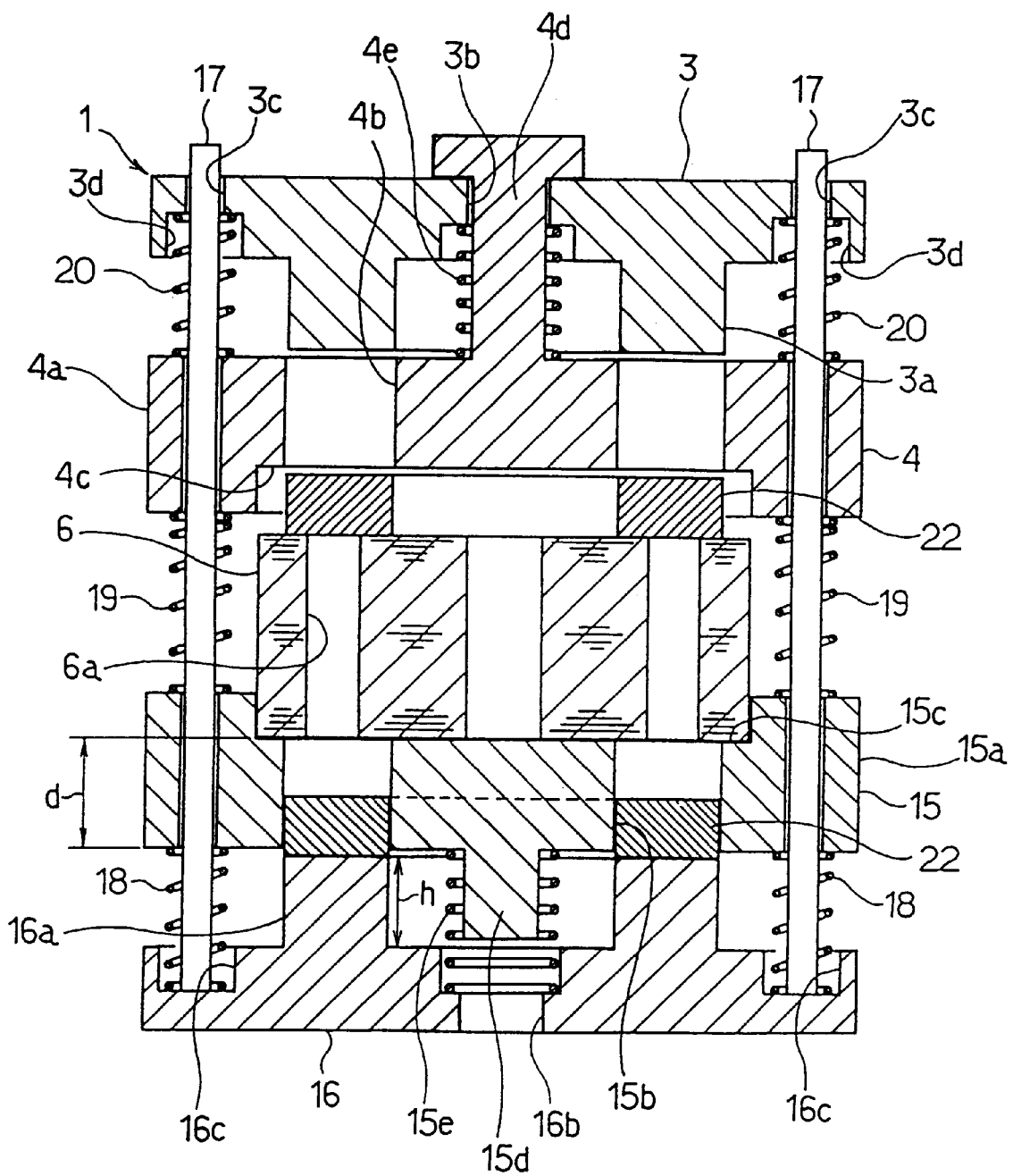
FIG. 7 is a view similar to FIG. 2 in the third embodiment.
Figure 8:
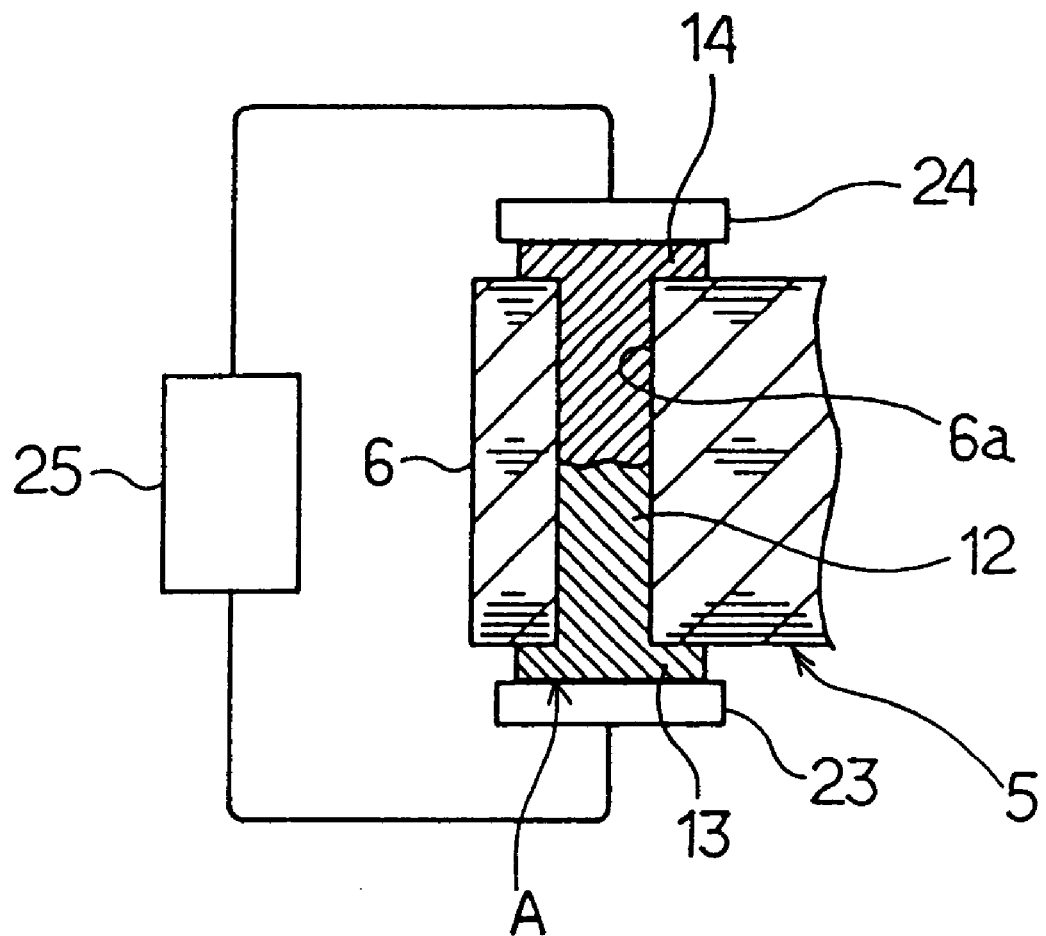
FIG. 8 schematically illustrates fusion of junctures of forged materials.

FIGS. 6 to 8 illustrate a third embodiment of the invention. Identical parts are labeled by the same reference numerals as in the first embodiment. The differences between the first and third embodiments will be described. Referring to FIG. 7, the forging die assembly 1 comprises a lower die 2 serving as a first pressing die, an upper die 3 serving as a second pressing die, an upper intermediate die 4, and a lower intermediate die 15.

The forging die assembly 1 will be described in detail. The lower die 16 is provided with an annular convexity or punch 16a formed on the upper surface thereof and corresponding to the end ring 13 of the squirrel-cage conductor A. The lower die 16 also has a central stepped guide hole 16b with a large diameter upper portion. The lower die 16 further has in its outer periphery a plurality of spring accommodating concavities 16c. A plurality of guide bars 17 stand on the concavities 16c respectively. The lower intermediate die 15 comprises an annular outer movable die 15a and a circular block-like inner movable die 15b. The outer movable die 15a has a stepped portion 15c receiving the upper peripheral edge of the rotor core 6 (the outer peripheral side of the end ring 13). The inner circumferential face of the outer movable die 15a is adapted to be fitted with the outer circumferential face of the punch 16a. The outer movable die 15a has through holes through which guide bars 17 extend respectively so that the outer movable die 15a is vertically movable. Each guide bar 17 is provided with a compression coil spring 18 located between the outer movable die 15a and the lower die 16. The inner movable die 15b is adapted to receive the undersurface of the rotor core 6 (the inner circumference of the end ring 13). The inner movable die 15b is further adapted to be fitted with the inner circumferential face of the punch 16a. A guide shaft 15d formed integrally on the undersurface of the inner movable die 15b is inserted through the guide hole 16b of the lower die 16 so that the inner movable die 15b is vertically moved. The guide shaft 15d is provided with a compression coil spring 15e located between the inner movable die 15b and the lower die 16 in a large diameter portion of the guide hole 16b. The height h of the punch 16a is set so as to be smaller than the depth d of the space defined between the outer and inner movable dies 15a and 15b of the intermediate die 15. Consequently, the first annular concavity 21 (see FIG. 6) is defined by the lower die 16 and the outer and inner movable dies 15a and 15b when the lower die 16 is caused to abut against the lower intermediate die 15, as is shown in FIG. 6. Each guide bar 17 is provided with a compression coil spring 19 located between the lower and upper intermediate dies 15 and 4 and a compression coil spring 20 located between the upper intermediate die 4 and the upper die 3. The upper die 3 has a plurality of recesses 3d for accommodating the springs 20 respectively.

In the making of the squirrel-cage rotor 5, the lower end of the rotor core 6 is positioned on the stepped portion 15c of the outer movable die 15a of the lower intermediate die 15 to be accommodated in the die 15a, as is shown in FIG. 7. With this, two forging material rings 22 are placed on the upper surface of the punch 16a of the lower die 16 and the upper surface of the rotor core 6 respectively. Each forging material ring 22 is a metal of the same material as of the forging material 10 in the first embodiment but has a thickness smaller than the material 10. The cylinder is actuated to lower the upper die 3 and the upper intermediate die 4 after the rotor core 6 and the forging material rings 22 have been set as described above. Then, the compression coil springs 19 are contracted so that the upper die 3 and the upper intermediate die 4 are lowered. Consequently, the upper portion of the rotor core 6 is fitted with the stepped portion 4c of the outer movable 4a of the intermediate die 4. This contracts the compression coil springs 20 and 18, whereupon the upper die 3 and the intermediate dies 4 and 15 are lowered with the rotor core 6 being held between the intermediate dies 4 and 15.

The punch 3a of the upper die 3 is caused to enter the space between the outer and inner movable dies 4a and 4b of the upper intermediate die 4 upon descent of the upper and intermediate dies 3, 4 and 15 to thereby plastically deform the upper forging material ring 22. Consequently, the forging material ring 22 in the second concavity 11 is caused to enter the slots 6a of the rotor core. With this, the punch 16a of the lower die 16 enters the space between the lower intermediate die 15 and the outer and inner movable dies 15a and 15b to pressurize the lower forging material ring 22, which is then plastically deformed. Consequently, the forging material ring 22 in the first concavity 21 is caused to enter the slots 6a of the rotor core 6. Subsequently, an upper half of each slot 6a and the second concavity 11 are filled by the upper forging material ring 22. With this, a lower half of each slot 6a and the first concavity 21 are filled by the lower forging material ring 22 when the lower intermediate die 15 abuts against the lower die 16 to be stopped. The forging material 22 filling each slot 6a is formed into a bar conductor 12. The forging material 22 filling the first concavity 21 is formed into the lower end ring 13. The forging material 22 filling the second concavity 11 is formed into the upper end ring 14.

Upon completion of the forming of the bar conductors 12 and the end rings 13 and 14 (the squirrel-cage conductor A), the cylinder is stopped so that the restoring force of the compression coil springs 18 to 20 raises the intermediate and upper dies 4, 15 and 3 to the former positions, whereupon the rotor core 6 (the squirrel-cage rotor 5) is taken out of the forging die assembly 1. Subsequently, electrodes 23 and 24 are connected to the end rings 13 and 14 respectively so that a high frequency electric power (a high frequency of about several hundreds Hz, for example) from a power supply circuit 25 is supplied to the bar conductors 12, as is shown in FIG. 8. Consequently, Joule's heat is produced at a junction of the forging material rings 22 entering each slot 6a through its upper and lower openings. Each junction is resistance-welded by the Joule's heat. In execution of the resistance welding, the squirrel-cage rotor 5 is preferably accommodated in the forging die assembly 1 so that the junctions of the forging material rings 22 are pressurized by the upper and lower dies 3 and 16, whereby the welding can be performed desirably.

The same effect can be achieved in the third embodiment as in the first embodiment. In the third embodiment, particularly, the forging material 22 is pressurized by the upper and lower dies 3 and 16 to enter each slot 6a through its upper and lower openings such that the forging material 22 fills the first and second concavities 21 and 11 and each slot 6a. Consequently, since the forging stroke for the forging material 22 is reduced to a half of the axial length of each slot 6a, the bar conductors 12 can be forged readily. Furthermore, the forging material 22 at the upper side of the rotor core 6 need not be advanced into the first concavity 21 at the lower side of the rotor core 6 in the third embodiment though the forging material at the upper side of the rotor core 6 is caused to enter the lower concavity through the slots in the first embodiment. Consequently, the first end ring 13 can be forged readily. Additionally, the junction of the forging material 22 composing each bar conductor 12 is welded when the electric power is supplied to each bar conductor 12. Consequently, since the variations in the rotor resistance can be reduced, the characteristics of the squirrel-cage rotor 5 can be improved.

The resistance welding of the junctions of the forging material executed in the third embodiment may be employed in the first and second embodiments. In such a case, since the forging material at the lower end ring 13 side has junctions, these junctions are welded.

Figure 9:
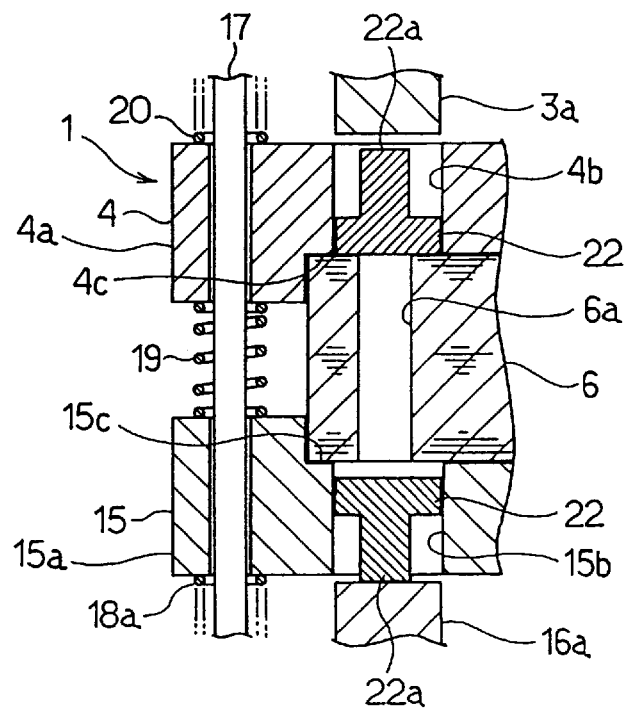
FIG. 9 is a view similar to FIG. 4 showing a fourth embodiment of the method in accordance with the present invention.

FIG. 9 illustrates a fourth embodiment of the present invention. Identical parts are labeled by the same reference numerals as in the third embodiment. The differences between the third and fourth embodiments will be described. Each of the upper and lower pieces of forging material 22 has a plurality of fitted convexities 22a formed thereon to protrude in the direction opposite the rotor core 6 and to correspond to the slots 6a of the same respectively. Each convexity 22a is formed into a cylindrical shape with approximately the same diameter as each slot 6a and is inclined in accordance with the skew angle of the slots 6a.

In the making of the squirrel-cage rotor 5, the upper and lower fitted convexities 22a of the forging material 22 are pressurized by the punch 3a of the upper die 3 and the punch 16a of the lower die 16 respectively, so that the convexities 22a are plastically deformed. Since the pressing force of each of the punches 3a and 16a concentrically acts on the convexities 22a, the convexities can be caused to enter the slots 6a by a relatively small pressing force. Thus, the bar conductors 12 and the end rings 13 and 14 of the squirrel-cage conductor A can be easily formed by means of forging.

Although both of the upper and lower pieces of the forging material 22 are formed with the convexities 22a, the forging material may be formed with the convexities projecting in the direction opposite the rotor core 6 or opposite the punch 3a when the forging material positioned at either one of the sides of the rotor core 6 is caused to enter the slots 6a as in the first embodiment.

Figure 10:
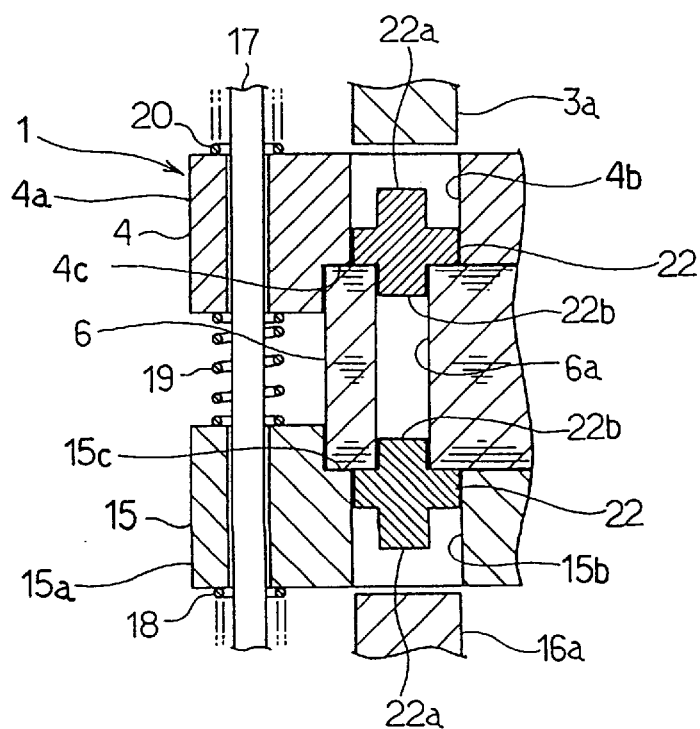
FIG. 10 is also a view similar to FIG. 4 showing a fifth embodiment of the method in accordance with the present invention.

FIG. 10 illustrates a fifth embodiment of the invention. Identical parts are labeled by the same reference numerals as in the fourth embodiment. The differences between the fourth and fifth embodiments will be described. Each of the upper and lower pieces of forging material 22 further has a plurality of fitted convexities 22b formed thereon to project in the direction of the rotor core 6 and to correspond to the slots 6a of the same respectively. Each convexity 22b is inclined in accordance with the skew angle of the slots 6a and has such a length as to be allowed to be inserted into each slot 6a.

In the making of the squirrel-cage rotor 5, the fitted convexities 22b of the upper piece of the forging material 22 are fitted into the slots 6a through the upper openings thereof and the fitted convexities 22b of the lower piece of the forging material 22 are fitted into the slots 6a through the lower openings thereof, whereby the forging material pieces are positioned relative to the rotor core 6. The convexities 22a of both forging material pieces 22 are pressurized by the punch 3a of the upper die 3 and the punch 16a of the lower die 16 to be plastically deformed.

Consequently, an upper half of the interior of each slot 6a and the second concavity 11 are filled by the upper piece of the forging material 22, while a lower or the other half of the interior of each slot 6a and the first concavity 21 are filled by the lower piece of the forging material 22.

The same effect can be achieved in the fifth embodiment as in the fourth embodiment. In the fifth embodiment, particularly, the pressing force of each of the punches 3a nd 16a concentrically acts on the convexities 22a, the bar conductors 12 and the end rings 13 and 14 can be formed by a relatively small pressing force by means of forging. Furthermore, the convexities 22b can prevent displacement of each forging material piece 22, and the forging stroke for the forging material 22 can be reduced.

Although both of the upper and lower pieces of the forging material 22 are formed with the pressing convexities 22a and the positioning convexities 22b, the forging material may be formed with the fitted convexities projecting toward the rotor core 6 and the pressing convexities projecting in the direction opposite the rotor core 6 when the forging material positioned at either one of the sides of the rotor core 6 is caused to enter the slots 6a as in the first embodiment.

Figures 11A, 11B, 11C:
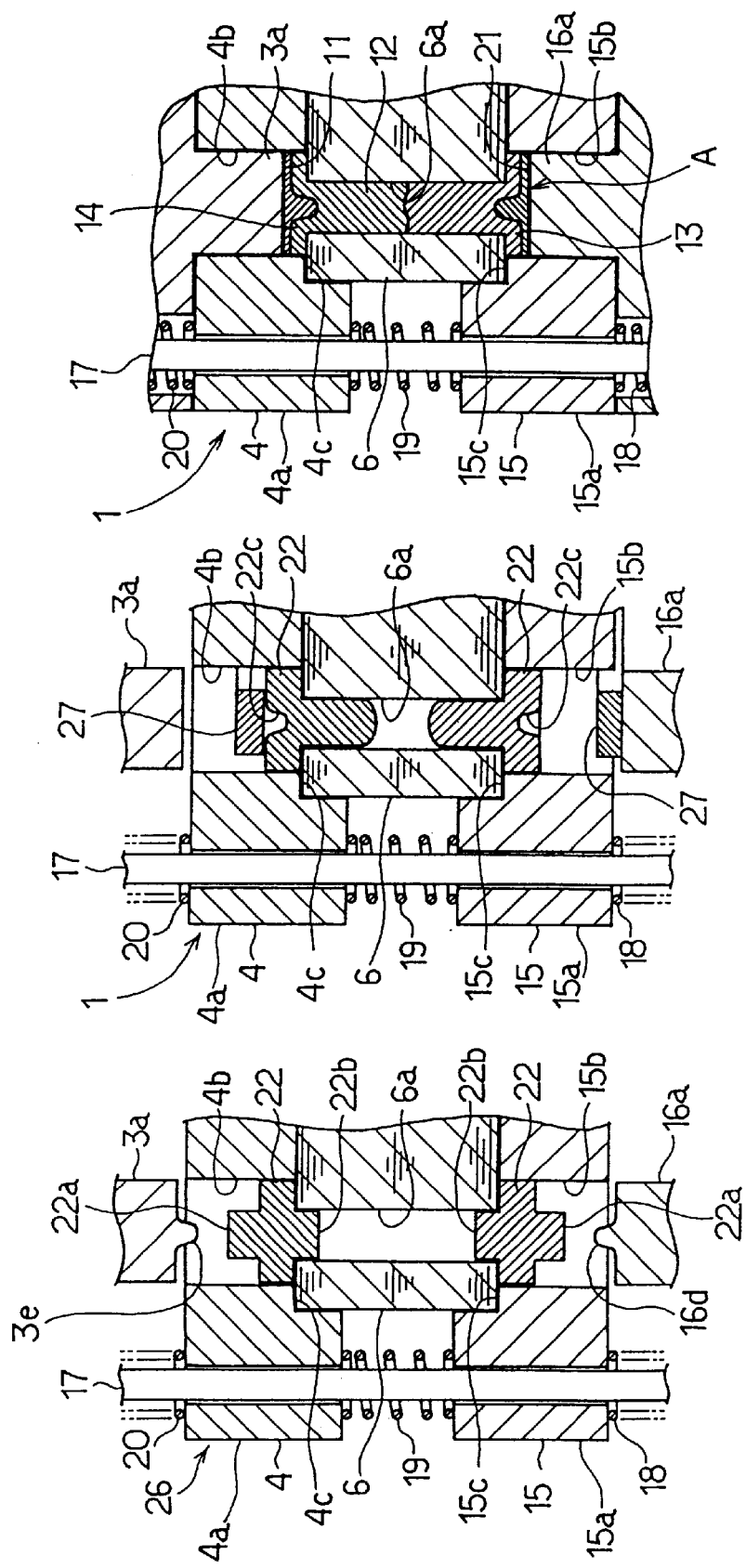
FIGS. 11A, 11B and 11C are views similar to FIG. 4 showing different conditions in a sixth embodiment of the method in accordance with the present invention.

FIGS. 11A, 11B and 11C illustrate a sixth embodiment of the invention. Identical parts are labeled by the same reference numerals as in the fifth embodiment. The differences between the fifth and sixth embodiments will be described. The forging die assembly 26 as shown in FIG. 11A is substantially the same as the assembly 1 in the fifth embodiment with the exception of a plurality of projections 3e and 16d formed on the lower and upper surfaces of the punches 3a and 16a of the upper and lower dies 3 and 16 respectively. One of the projections 3e and one of the projections 16d are shown in FIG. 11A. The projections 3e and 16d are formed so as to correspond to the slots 6a of the rotor core 6.

In the making of the squirrel-cage rotor 5, the fitted convexities 22b of the upper and lower pieces of the forging material 22 are fitted into the slots 6a through the upper and lower openings thereof, whereby the forging material pieces are attached to the rotor core 6. The cylinder for the forging die assembly 26 is actuated to lower the upper and intermediate dies 4 and 15 so that the convexities 22a of the upper and lower pieces of the forging material 22 are pressurized by the punches 3a and 16a of the upper and lower dies 3 and 16 to be plastically deformed. Consequently, the forging material pieces are caused to enter the slots 6a, and the depressions 22c are formed on the surfaces of the forging material pieces by the projections 3e of the punch 3a and the projections 16d of the punch 16a, as shown in FIG. 11B.

The forging die assembly 26 is opened so that the rotor core 6 and the forging material 22 are taken out when the condition as shown in FIG. 11B is reached. The rotor core 6 and the forging material 22 thus taken out of the die assembly 26 are further attached to the forging die assembly 1. Subsequently, new ring-shaped forging material pieces 27 are placed on the upper surface of the punch 16a of the lower die 16 and on the upper surface of the rotor core 6, as shown in FIG. 11B. Each forging material piece 27 is composed of the same metal as in each piece 22 and has a size larger than the same.

Upon actuation of the cylinder for the forging die assembly 1 in the condition as shown in FIG. 11B, the forging material pieces 27 are pressurized by the punches 3a and 16a to be plastically deformed such that the forging material pieces 22 are caused to enter the slots 6a of the rotor core 6. Consequently, the slots 6a and the concavities 11 and 21 are filled by the forging material pieces 22 and 27, whereby the bar conductors 12 and the two end rings 13 and 14 composing the squirrel-cage conductor A are formed as shown in FIG. 11C.

The same effect can be achieved in the sixth embodiment as in the fifth embodiment. In the sixth embodiment, particularly, the two forging material pieces 22 are pressurized to be caused to enter the slots 6a of the rotor core 6 and thereafter, the two new forging material pieces 27 are pressurized to be plastically deformed. This working step is executed once so that the slots 6a of the rotor core 6 are filled by the forging material pieces 22. Accordingly, the forging material pieces 22 and 27 are pressurized by a relatively small pressing force to be plastically deformed such that the slots 6a and the concavities 11 and 21 can be filled by the forging material pieces 22 and 27, even when each slot 6a has a relatively larger axial dimension. Consequently, the bar conductors 12 and the end rings 13 and 14 can be readily formed by means of forging. Furthermore, the forging material pieces 22 are pressurized by the upper and lower dies 3 and 16 having the projections 3e and 16d respectively so that the depressions 22c are formed on each of the forging material pieces 22. Thereafter, the depressions 22c are buried by the other forging material pieces 27. Accordingly, the new forging material pieces 27 can be easily adapted to the former forging material pieces 22. Consequently, since removal of the new forging material pieces 27 can be reliably prevented, the quality of the squirrel-cage rotor can be improved. Additionally, the punches 3a and 16a of the upper and lower dies 3 and 16 are formed with the projections 3e and 16d respectively corresponding to the slots 6a of the rotor core 6. Accordingly, the pressing force concentrically acts on the portions of each forging material piece 22 corresponding to the slots 6a when the forging material pieces 22 are pressed by the punches 3a and 16a. Consequently, the forging material pieces 22 can be readily caused to enter the slots 6a.

The punches 3a and 16a of the upper and lower dies 3 and 16 are formed with the projections 3e and 16d corresponding to the slots 6a of the rotor core 6 in the above-described sixth embodiment. A single circumferentially extending annular projection may be formed on each of the punches 3a and 16a, instead. Furthermore, although the ring-shaped forging material pieces 27 are employed in the sixth embodiment, a plurality of arc-shaped pieces of the forging material may be used, instead. The end rings 13 and 14 are formed by rolling the arc-shaped forging material pieces radially and circumferentially in the first and second concavities 21 and 11 respectively. Although the forging step including pressurization of the new forging material pieces 27 is executed once in the forgoing embodiment, this forging step may be executed at a plurality of time s when each slot 6a has a larger axial dimension, or a plurality of pieces of the forging material may be pressurized to be plastically deformed at a plurality of times.

Although the forging material pieces 22 are caused to enter the slots 6a through both of the upper and lower openings thereof in the foregoing embodiment, the forging material piece may be caused to enter the slots through either one of the openings as in the first and second embodiments. In this regard, the forging step including pressurization of the new forging material piece 27 may be executed at least once.

Although the forging material pieces 22 and 27 are formed of aluminum in the third to sixth embodiments, a relatively soft, electrically well conductive metal such as copper or a relatively hard, electrically well conductive metal such as iron may be employed as the forging material, instead. Although the ring-shaped forging material piece 10 or pieces 22 are used in the first to sixth embodiments, a plurality of arc-shaped pieces of the forging material may be used, instead. In this case, the forging material pieces fill the slots 6a, being rolled in the concavities 2b, 21 and 11 radially and circumferentially.

Figure 12:
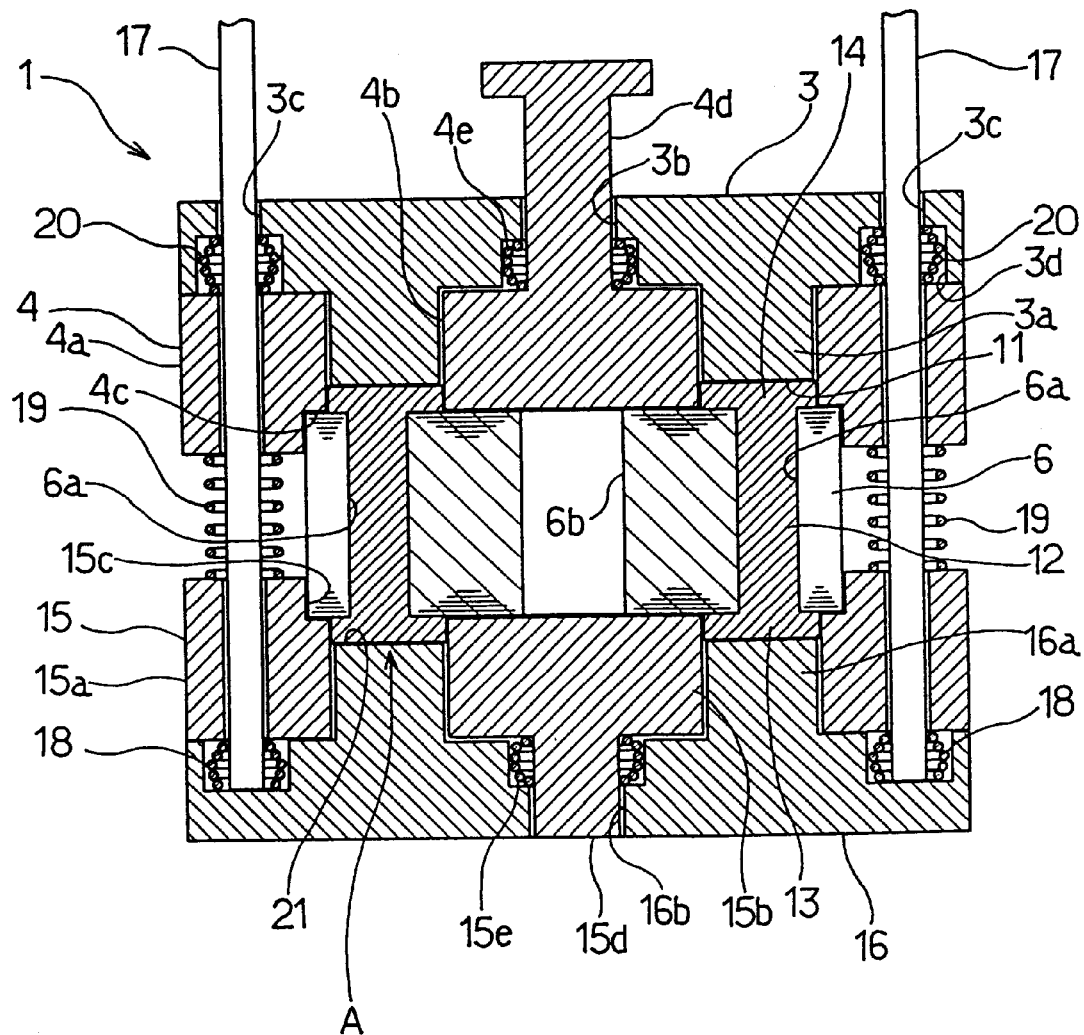
FIG. 12 is a view similar to FIG. 1, showing a seventh embodiment of the present invention.
Figure 13:
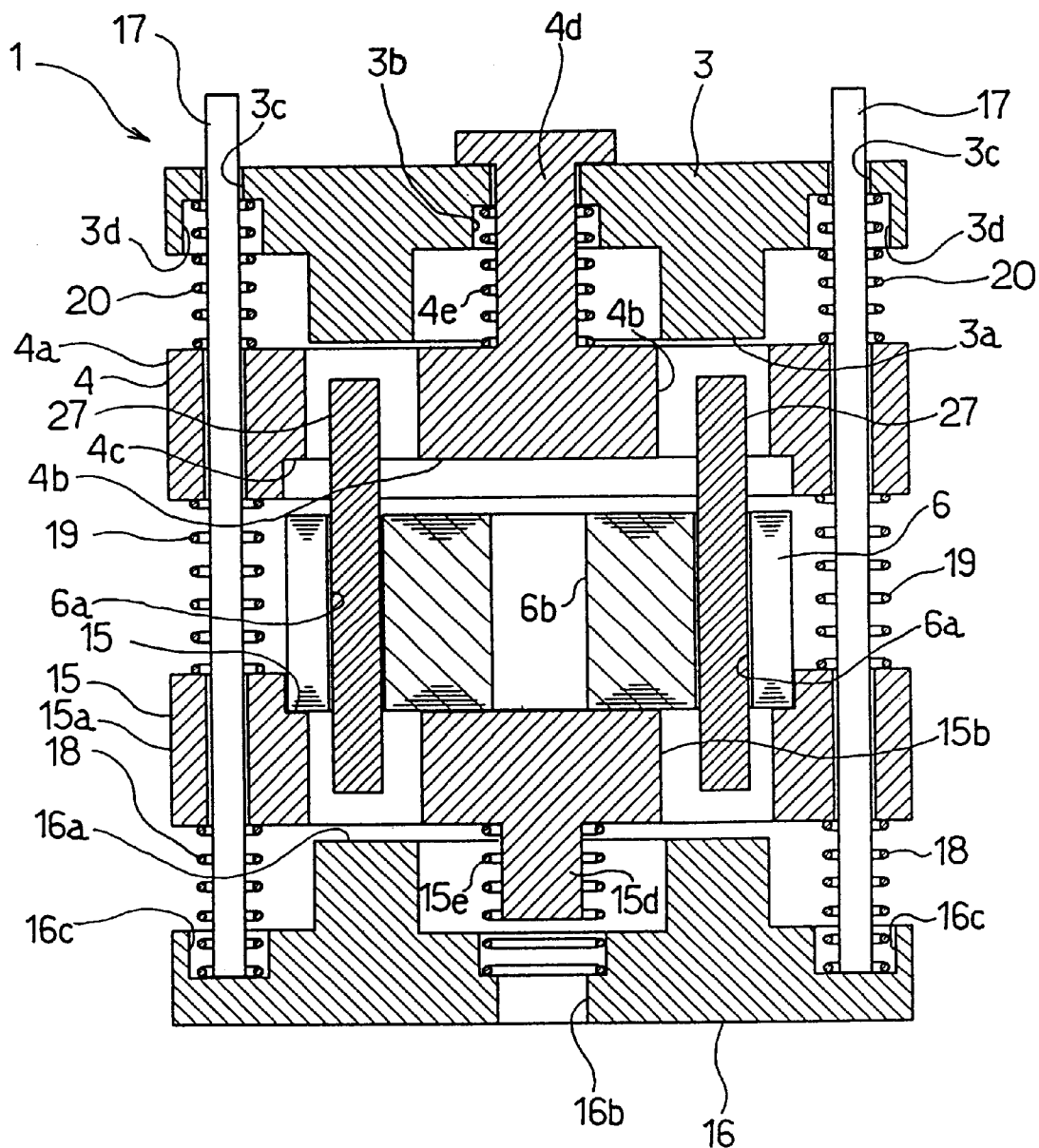
FIG. 13 is a view similar to FIG. 2, showing the seventh embodiment.

FIGS. 12 and 13 illustrate a seventh embodiment of the invention. The differences between the third and seventh embodiments will be described. Identical parts are labeled by the same reference numerals as in the third embodiment. Referring to FIG. 13, forging material bars 27 are used instead of the forging material 22. Each forging material bar 27 is composed of the same metal as of the forging material 22. Each forging material bar 27 is formed into the shape of a rounded bar having a diameter slightly smaller than the inner diameter of each slot 6a of the rotor core 6 and a length larger than each slot 6a. Each forging material bar 27 is adapted to be accommodated in the slot 6a with both ends being projected from the respective ends of the rotor core 6 approximately the same length. The rotor core 6 with the forging material bars 27 being accommodated in the respective slots 6a is set in the lower intermediate die 15 of the forging die assembly 1 as shown in FIG. 13.

The cylinder for the forging die assembly 1 is actuated in the above-described condition to lower the upper die 3 and the upper intermediate die 4. The compression coil springs 19 are then contracted to thereby lower the dies 3 and 4 so that a stepped portion 4c of an outer movable die 4a of the intermediate die 4 is fitted with the upper portion of the rotor core 6. Consequently, the compression coil springs 20 and 18 are contracted such that the upper die 3 and the intermediate dies 4 and 15 are lowered with the rotor core 6 being held between the dies 4 and 15. Upon descent of the dies 3, 4 and 15, the punch 3a of the upper die 3 is advanced into the space between the outer and inner movable dies 4a and 4b of the upper intermediate die 4 to thereby pressurize the upper end portion of each forging material bar 27, whereby each forging material bar 27 is plastically deformed. Consequently, the upper end portion of each forging material bar 27 is rolled in the second concavity 11. At the same time, the punch 16a of the lower die 16 is advanced into the space between the outer and inner movable dies 15a and 15b of the lower intermediate die 15 to pressurize the lower end portion of each forging material bar 27 to plastically deform the same. Consequently, the lower end portion of each forging material bar 27 is rolled in the first concavity 21. Subsequently, the upper die 3 is abutted against the upper intermediate die 4 to be stopped, and the lower intermediate die 15 is abutted against the lower die 16 to be stopped. Consequently, the slots 6a and the first and second concavities 21 and 11 are filled by the forging material bars 27. Portions of the forging material bars 27 filling the respective slots 6a are formed into the bar conductors 12. Portions of the forging material bars filling the first concavity 21 are formed into the lower end ring 13, whereas portions thereof filling the second concavity 11 are formed into the upper end ring 14.

Upon completion of the forming of the bar conductors 12 and the end rings 13 and 14 (the squirrel-cage conductor A), the forging die assembly 1 is opened so that the squirrel-cage rotor 5 is taken out of the same. Subsequently, the electrodes are connected to the end rings 13 and 14 respectively so that the high frequency electric power is supplied to the bar conductors 12. Consequently, the Joule's heat is produced at junctions of the forging material bars 27 composing the end rings 13 and 14 such that the junctions are resistance-welded to one another. In execution of the resistance welding, the squirrel-cage rotor 5 is preferably accommodated in the forging die assembly 1 so that the junctions are pressurized, whereby the welding can be performed desirably.

The same effect can be achieved in the seventh embodiment as in the third embodiment. In the seventh embodiment, particularly, the forging material bars 27 are previously accommodated in the slots 6a respectively. In this condition, both ends of the forging material bars 27 are pressurized by the forging die assembly 1 to be plastically deformed so that the bar conductors 12 and the end rings 13 and 14 (the squirrel-cage conductor A) are formed. Consequently, the forging can be stably executed by application of a relatively small pressing force.

In the seventh embodiment, the forging material bars 27 are accommodated in the respective slots 6a of the rotor core 6 after the slots have been skewed. The forging material bars 27 may be accommodated in the respective slots 6a before the slots are skewed, instead. In this case, the forging material bars 27 can be easily accommodated in the respective slots 6a.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

I claim:

1. A method of making a squirrel-cage rotor comprising a rotor core having a plurality of slots therein and a squirrel-cage conductor including a plurality of bar conductors embedded in the slots and two end rings interconnecting both ends of the bar conductors in the form of a ring at both ends of the rotor core, the method comprising the steps of:
   pressurizing a forging material disposed at both ends of the rotor core by use of a forging die assembly to plastically deform the forging material, thereby forming the squirrel-cage conductor, the forging die assembly including a receiving die having a first annular concavity for receiving therein one of the ends of the rotor core and corresponding to one of the end rings and a pressing die for forming a second annular concavity corresponding to the other end ring with movement relative to the other end of the rotor core;
   connecting an electric power supply to the end rings of the squirrel-cage rotor so that junctions of the forging material of the squirrel-cage conductor heat up to be welded, thereby reducing variations in resistance of the squirrel-cage conductor;
   setting said one of the ends of the rotor core in the receiving die;
   setting the forcing material in said other end of the rotor core;
   forming a plurality of fitted convex portions on the forging material, the fitted convex portions being fitted into axial end openings of the plurality of slots of the rotor core, each of the plurality of fitted convex portions having a length smaller than an axial length of each of the plurality of slots; and
   moving the pressing die relative to said other end of the rotor core to pressurize the forging material into plastic deformation thereof so that the forging material is caused to enter the first annular concavity through the slots so as to fill the first and second annular concavities and the slots, whereby the squirrel-cage conductor is formed, the step of plastically deforming the forgoing material being executed after execution of the step of forming the plurality of fitted convex portions.

2. A method of making a squirrel-cage rotor comprising a rotor core having a plurality of slots therein and a squirrel-cage conductor including a plurality of bar conductors embedded in the slots and two end rings interconnecting both ends of the bar conductors in the form of a ring at both ends of the rotor core, the method comprising the steps of:
   pressurizing a forging material disposed at both ends of the rotor core by use of a forging die assembly to plastically deform the forging material, thereby forming the squirrel-cage conductor, the forging die assembly including a first pressing die for forming a first annular concavity corresponding to one of the end rings with movement thereof relative to one end of the rotor core and a second pressing die for forming a second annular concavity corresponding to the other end ring with movement thereof relative to the other end of the rotor core;
   connecting an electric power supply to the end rings of the squirrel-cage rotor so that junctions of the forging material of the squirrel-cage conductor heat up to be welded, thereby reducing variations in resistance of the squirrel-cage conductor;
   setting the forging material in each of both ends of the rotor core;
   forming a plurality of fitted convex portions on the forging material, the plurality of fitted convex portions being fitted into axial end openings of the plurality of slots of the rotor core, each of the plurality of fitted convex portions having a length smaller than an axial length of each of the plurality of slots; and
   moving the first and second pressing dies relative to said one and said other ends of the rotor core respectively to pressurize the forging material into plastic deformation thereof so that the forging material is caused to enter the slots such that the forging material from said one end of the rotor core fills the first annular concavity and one part of interior of each slot and such that the forging material from said other end of the rotor core fills the second annular concavity and the other part of interior of each slot, whereby the squirrel-cage conductor is formed, the step of plastically deforming the forging material being executed after execution of the step of forming the plurality of fitted convex portions.

3. A method of making a squirrel-cage rotor comprising a rotor core having a plurality of slots therein and a squirrel-cage conductor including a plurality of bar conductors embedded in the slots and two end rings interconnecting both ends of the bar conductors in the form of a ring at both ends of the rotor core, the method comprising the steps of:
   pressurizing a forging material disposed at both ends of the rotor core by use of a forging die assembly to plastically deform the forging material, thereby forming the squirrel-cage conductor, the forging die assembly including a receiving die having a first annular concavity for receiving therein one of the ends of the rotor core and corresponding to one of the end rings and a pressing die for forming a second annular concavity corresponding to the other end ring with movement relative to the other end of the rotor core;
   connecting an electric power supply to the end rings of the squirrel-cage rotor so that junctions of the forging material of the squirrel-cage conductor heat up to be welded, thereby reducing variations in resistance of the squirrel-cage conductor;
   setting said one of the ends of the rotor core in the receiving die;
   setting the forging material in said other end of the rotor core;

forming a plurality of pressed convex portions on a face of the forging material opposite to the rotor core so that the plurality of pressed convex portions correspond to the plurality of slots, each of the plurality of pressed convex portions being adapted to be pressed by the pressing die; and moving the pressing die relative to said other end of the rotor core to pressurize the forging material into plastic deformation thereof so that the forging material is caused to enter the first annular concavity through the slots so as to fill the first and second annular concavities and the slots, whereby the squirrel-cage conductor is formed, the step of plastically deforming the forging material being executed after execution of the step of forming the plurality of pressed convex portions.

4. A method of making a squirrel-cage rotor comprising a rotor core having a plurality of slots therein and a squirrel-cage conductor including a plurality of bar conductors embedded in the slots and two end rings interconnecting both ends of the bar conductors in the form of a ring at both ends of the rotor core, the method comprising the steps of:

pressurizing a forging material disposed at both ends of the rotor core by use of a forging die assembly to plastically deform the forging material, thereby forming the squirrel-cage conductor, the forging die assembly including a first pressing die for forming a first annular concavity corresponding to one of the end rings with movement thereof relative to one end of the rotor core and a second pressing die for forming a second annular concavity corresponding to the other end ring with movement thereof relative to the other end of the rotor core;

connecting an electric power supply to the end rings of the squirrel-cage rotor so that junctions of the forging material of the squirrel-cage conductor heat up to be welded, thereby reducing variations in resistance of the squirrel-cage conductor, setting the forging material in each of both ends of the rotor core;

forming a plurality of pressed convex portions on a face of the forging material opposite to the rotor core so that the plurality of pressed convex portions correspond to the plurality of slots, each of the plurality of pressed convex portions being adapted to be pressed by the pressing die; and moving the first and second pressing dies relative to said one and said other ends of the rotor core respectively to pressurize the forging material into plastic deformation thereof so that the forging material is caused to enter the slots such that the forging material from said one end of the rotor core fills the first annular concavity and one part of interior of each slot and such that the forging material from said other end of the rotor core fills the second annular concavity and the other part of interior of each slot, whereby the squirrel-cage conductor is formed, the step of plastically deforming the forging material being executed after the execution of the step of forming the plurality of pressed convex portions.

5. A method according to claim 1, which further comprises the step of forming a plurality of pressed convex portions on a face of the forging material opposite to the rotor core so that the plurality of pressed convex portions correspond to the plurality of slots, each of the plurality of pressed convex portions being adapted to be pressed by the pressing die, wherein the step of plastically deforming the forging material is executed after execution of the step of forming the plurality of pressed convex portions.

6. A method according to claim 4, which further comprises the step of forming a plurality of fitted convex portions on the forging material, the plurality of fitted convex portions being fitted into axial end openings of the plurality of slots of the rotor core, each of the plurality of fitted convex portions having a length smaller than an axial length of each of the plurality of slots, wherein the step of plastically deforming the forging material is executed after execution of the step of forming the plurality of fitted convex portions.

* * * * *